(12) United States Patent
Agnew et al.

(10) Patent No.: US 7,625,528 B2
(45) Date of Patent: Dec. 1, 2009

(54) PRE-REFORMER

(75) Inventors: Gerard D Agnew, Derby (GB); Robert H Cunningham, Derby (GB); Gary J Saunders, Crewe (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 12/222,205

(22) Filed: Aug. 5, 2008

(65) Prior Publication Data
US 2008/0292925 A1   Nov. 27, 2008

Related U.S. Application Data

(62) Division of application No. 10/883,794, filed on Jul. 6, 2004.

(30) Foreign Application Priority Data

Jul. 26, 2003   (GB) ................... 0317573.4

(51) Int. Cl.
*B01J 8/00* (2006.01)
*B01D 50/00* (2006.01)

(52) U.S. Cl. ............. 422/170; 422/186.04; 422/213; 422/78.11; 422/187; 422/199; 422/222; 422/188; 48/127.9; 48/128

(58) Field of Classification Search ........... 422/186.04, 422/213, 170; 219/78.11; 208/106; 48/61
See application file for complete search history.

(56) References Cited

U.S. PATENT DOCUMENTS 3,616,381 A   10/1971  Krenzke
5,922,291 A *  7/1999  Hanfling et al. ............. 422/211
5,942,346 A    8/1999  Ahmed
6,929,785 B2 * 8/2005  Grieve et al. ................. 422/199
7,160,342 B2  1/2007  Grieve
2003/0024873 A1  2/2003  Klass
2004/0154222 A1  8/2004  Burch
2005/0013769 A1  1/2005  Bowe

FOREIGN PATENT DOCUMENTS

| | | |
|---|---|---|
| EP | 0913357 A1 | 5/1999 |
| FR | 2831154 A | 4/2003 |
| GB | 0830379 A | 3/1960 |
| JP | 2003206102 A | 7/2003 |

* cited by examiner

*Primary Examiner*—Alexa D. Neckel
*Assistant Examiner*—Kaity V. Handal
(74) *Attorney, Agent, or Firm*—Jeffrey S. Melcher; Manelli Denison & Selter PLLC

(57) ABSTRACT

A pre-reformer (10) comprises a non-electrically conducting gas tight duct (12) and an electrically conducting wire (14) arranged in the duct (12). The electrically conducting wire (14) is electrically isolated from the duct (12). The duct (12) has an inlet (16) for receiving a hydrocarbon fuel at a first end (18) and an outlet (20) for supplying a pre-reformed hydrocarbon fuel at a second end (22). At least the inner surface (24) of the duct (12) is chemically inert with respect to the hydrocarbon fuel. An electrical power supply (26) is electrically connected to the electrically conducting wire (14) and a control means (28) controls the supply of electrical current through the electrically conducting wire (14) to maintain the electrically conducting wire (14) at a temperature to provide selective thermal decomposition of higher hydrocarbons in the hydrocarbon fuel. The performer reduces coking in associated fuel cells and other parts of a fuel cell system.

11 Claims, 1 Drawing Sheet

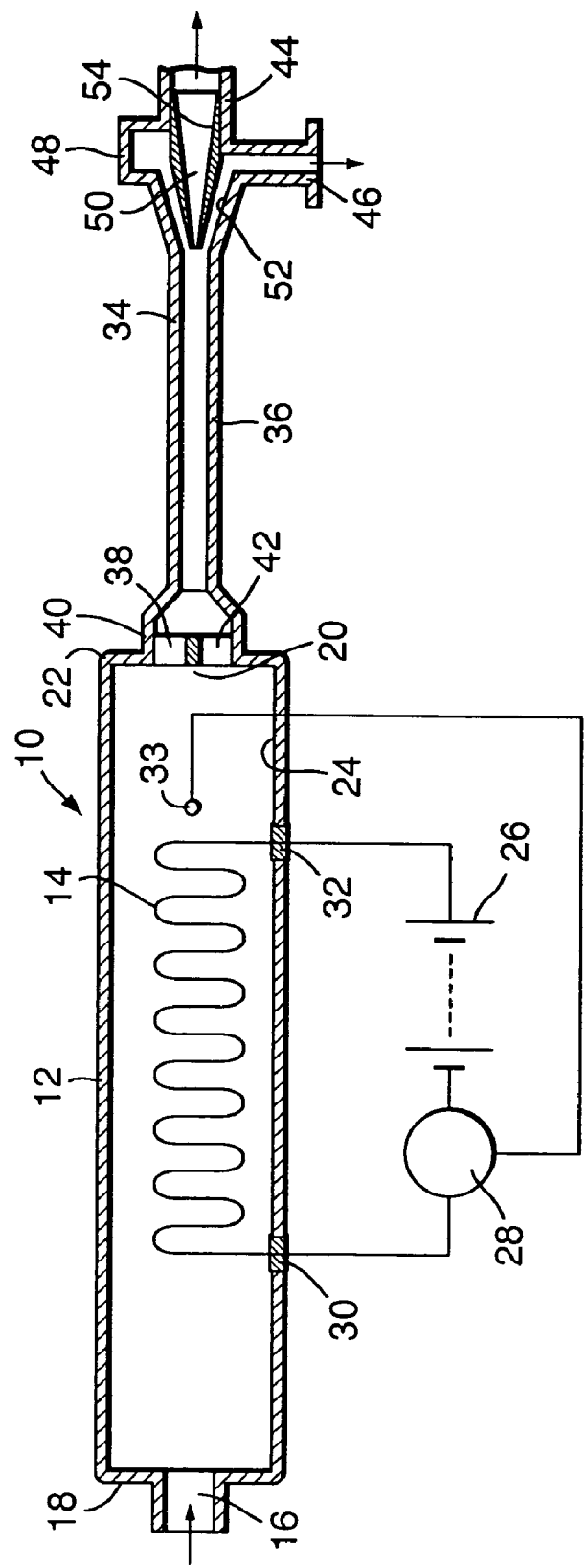

PRE-REFORMER

This is a Divisional Application of National application Ser. No. 10/883,794 filed Jul. 6, 2004 currently pending.

FIELD OF THE INVENTION

The present invention relates to a pre-reformer, in particular to a pre-reformer for fuel cells and more particularly to a pre-reformer for solid oxide fuel cells.

BACKGROUND OF THE INVENTION

Conventionally a fuel cell system comprises a fuel cell stack and an external reformer, or an internal reformer. The fuel cell stack comprises a plurality of fuel cells. The reformer reforms hydrocarbon fuel to a hydrogen based fuel suitable for use in the fuel cells in the fuel cell stack.

A problem associated with fuel cells operating with a reformer is that the higher hydrocarbons in the hydrocarbon fuel are not always reformed, or removed, in the reformer and this may subsequently lead to the higher hydrocarbons coking in the fuel cells or other parts of the fuel cell system.

Conventional ways of removing the higher hydrocarbons from the hydrocarbon fuel are complex and require additional reactant streams and are subject to the pressure and the temperature constraints of the fuel cell system.

SUMMARY OF THE INVENTION

Accordingly the present invention seeks to provide a novel reformer, which reduces, preferably overcomes, the above-mentioned problem.

Accordingly the present invention provides a pre-reformer comprising a gas tight duct and at least one electrically conducting member arranged in the duct, the at least one electrically conducting member is electrically isolated from the duct, the duct has an inlet for receiving a hydrocarbon fuel at a first end and an outlet for supplying a pre-reformed hydrocarbon fuel at a second end, at least the inner surface of the duct is chemically inert with respect to the hydrocarbon fuel, an electrical power supply electrically connected to the at least one electrically conducting member and control means to control the supply of electrical current through the at least one electrically conducting member to maintain the at least one electrically conducting member at a temperature to provide selective thermal decomposition of higher hydrocarbons in the hydrocarbon fuel.

Preferably the gas tight duct is non-electrically conducting.

Preferably the gas tight duct comprises a ceramic, a glass-ceramic or a glass.

Preferably a temperature sensor is arranged to measure the temperature in the duct and is electrically connected to the control means.

Preferably the at least one electrically conducting member extends through the walls of the duct and is directly electrically connected to the electrical power supply.

Preferably the electrically conducting member is electrically isolated from the duct by glass seals or glass-ceramic seals.

Alternatively the at least one electrically conducting member forms a loop, a second electrically conducting member is arranged outside the duct, the second electrically conducting member is electrically connected to the electrical power supply and the control means controls the supply of electrical current through the second electrically conducting member to maintain the at least one electrically conducting member at a temperature to provide selective thermal decomposition of higher hydrocarbons in the hydrocarbon fuel.

The at least one electrically conducting member may comprise a honeycomb.

Alternatively the at least one electrically conducting member comprises at least a portion of the duct.

Preferably the at least one electrically conducting member comprises a metal or an alloy.

Preferably the outlet of the duct is connected to a fuel cell stack.

Preferably the outlet of the duct is connected to a solid oxide fuel cell stack.

Preferably the outlet of the duct is connected to the fuel cell stack via means to remove particulate carbon from the pre-reformed hydrocarbon fuel.

Preferably the means to remove particulate carbon comprises an inertial separator. The inertial separator may comprise a duct having an inlet at a first end and first and second outlets at a second end, a plurality of swirl vanes are provided in the inlet at the first end of the duct, a central duct is provided at the center of the duct at the second end of the duct, an outer duct is arranged around the central duct, the central duct is connected to the first outlet and the outer duct is connected to the second outlet.

Alternatively the means to remove particulate carbon comprises a filter or an electrostatic separator.

Preferably the means to remove particulate carbon from the pre-reformed fuel is connected to the fuel cell stack via a reformer.

BRIEF DESCRIPTION OF THE DRAWINGS

The present invention will be more fully described by way of example with reference to the accompanying drawings in which:

FIG. 1 is a longitudinal cross-sectional view through a pre-reformer according to the present invention.

DETAILED DESCRIPTION OF THE INVENTION

A pre-reformer 10, as shown in FIG. 1, comprises a non-electrically conducting gas tight duct 12 and an electrically conducting wire 14 arranged in the duct 12. The electrically conducting wire 14 is electrically isolated from the duct 12, for example by glass seals 30 and 32. The duct 12 has an inlet 16 for receiving a hydrocarbon fuel, for example natural gas, at a first end 18 of the duct 12 and an outlet 20 for supplying a pre-reformed hydrocarbon fuel, for example methane, at a second end 22 of the duct 12. At least the inner surface 24 of the duct 12 is chemically inert with respect to the hydrocarbon fuel and preferably the duct 12 comprises a ceramic material, a glass-ceramic material or a glass material. An electrical power supply 26, either direct current or alternating current, is electrically connected to the electrically conducting wire 14, a control means 28 is arranged to control the supply of electrical current from the electrical power supply 26 and a temperature sensor 33 is provided to measure the temperature in the duct 12 and to supply a signal to the control means 28.

The outlet 20 of the duct 12 is connected to a solid oxide fuel cell stack (not shown) via a device 34 to remove particulate carbon from the pre-reformed hydrocarbon fuel, methane. The device 34 to remove particulate carbon is an inertial separator. The device 34 comprises a duct 36, which has an inlet 38 at a first end 40 and a plurality of swirl vanes 42 are provided in the inlet 38 of the duct 36. The duct 36 also has two outlets 44 and 46 at a second end 48. At the second end 48 of the duct 36 a central duct 50 is arranged in the centre of the duct 36 and an outer duct 52 is arranged around the central duct 50. The central duct 50 is connected to the outlet 44 and the outer duct 52 is connected to the outlet 46.

The outlet 44 of the device 34 to remove particulate carbon from the pre-reformed fuel, methane, is connected to the solid oxide fuel cell stack via a reformer (not shown). The reformer may be an internal reformer or an external reformer. It is essential that the duct 12 is inert with respect to the hydrocarbon fuel to ensure that there are no chemical reactions between the duct 12 and the hydrocarbon fuel. Likewise the duct 12 must be sealed to ensure that only the hydrocarbon fuel enters the duct to ensure that the hydrocarbon fuel cannot take part in chemical reactions.

In operation a hydrocarbon fuel, for example natural gas is supplied at a low pressure through the inlet 16 into the duct 12. The hydrocarbon fuel flows through the duct 12 and an electrical current is supplied from the power supply 26 through the electrically conducting wire 14. The electrically conducting wire 14 heats the hydrocarbon fuel flowing through the duct 12 and causes the higher hydrocarbons in the hydrocarbon fuel to thermally decompose on the surface of the electrically conducting wire 14. The control means 28 receives signals from the temperature sensor 33 and controls the supply of the electric current from the power supply 26 through the electrically conducting wire 14 to maintain the electrically conducting wire 14 at a temperature to provide selective thermal decomposition of the higher hydrocarbons only in the hydrocarbon fuel.

The pre-reformed hydrocarbon fuel containing carbon particles flows through the outlet 20 and exits the duct 12 and flows into the inlet 38 of the device 34 to remove particulate carbon.

The pre-reformed hydrocarbon fuel and carbon particles is swirled by the swirl vanes 42 and this causes the carbon particles to be flung to the regions of the duct 36 near to the inner surface of the duct 36 and the hydrocarbon fuel remains at the centre of the duct 36. The carbon particles then flow into the outer duct 52 at the second end 48 of the device 34 and through the outlet 46. The pre-reformed hydrocarbon fuel flows into the central duct 50 at the second end 48 of the device 34 and through the outlet 44 to the reformer and solid oxide fuel cells.

The advantages of the present invention are that coking in the solid oxide fuel cells and other parts of the solid oxide fuel cell system is reduced or prevented. The present invention operates at the inlet pressure of the hydrocarbon fuel supply. The present invention is simple and no additional reactants are required to react with the hydrocarbon fuel to remove the higher hydrocarbons. The present invention operates independently of the temperature and pressure constraints of the solid oxide fuel system. The present invention is located externally of the solid oxide fuel cell system and allows ease of maintenance and replacement.

Although the present invention has been described with reference to a specific device to remove particulate carbon other suitable devices may be used, for example other inertial separators, filters or electrostatic separators.

Although the present invention has been described with reference to a single electrically conducting wire inside the duct it may be possible, or desirable, to use a plurality of electrically conducting wires inside the duct. Alternatively one or more other electrically conducting members may be provided inside the duct, for example an electrically conducting honeycomb etc, which would increase the surface area for heat transfer but would require more electrical power.

Although the present invention has been described with reference to an electrically conducting wire, or electrically conducting member, inside the duct directly connected to a power supply outside the duct, it may be possible and advantageous to use an electrically conducting wire loop, or electrically conducting member, inside the duct indirectly connected to the power supply using an electrically conducting wire loop outside the duct and using electrical inductive heating from the external electrical conducting wire loop to the internal electrically conducting wire loop, or electrically conducting member.

Additionally, it may be possible for the duct, or at least a portion of the duct, to be an electrically conducting member and for the at least a portion of the duct to be directly, or indirectly, electrically heated.

The electrically conducting member is preferably chemically inert with respect to the hydrocarbon fuel or may act as a catalyst to enhance the thermal decomposition of the higher hydrocarbons and/or to minimise carbon deposition.

Although the present invention has been described with reference to a solid oxide fuel cell system, it may be applicable to other fuel cell systems.

Although the present invention has been described with reference to use with fuel cell systems it may be possible to use the pre-reformer with a reformer for other systems.

We claim:

1. A pre-reformer comprising:
   a gas tight duct,
   at least one electrically conducting member arranged in the duct, the at least one electrically conducting member is electrically isolated from the duct,
   the duct has an inlet for receiving a hydrocarbon fuel at a first end and an outlet for supplying a pre-reformed hydrocarbon fuel at a second end, the duct being adapted to receive only hydrocarbon fuel,
   at least the inner surface of the duct is chemically inert with respect to the hydrocarbon fuel,
   an electrical power supply electrically connected to the at least one electrically conducting member, and
   control means to control the supply of electrical current through the at least one electrically conducting member to maintain the at least one electrically conducting member at a temperature to provide selective thermal decomposition of higher hydrocarbons in the hydrocarbon fuel.

2. A pre-reformer as claimed in claim 1 wherein the gas tight duct is non-electrically conducting.

3. A pre-reformer as claimed in claim 1 wherein the gas tight duct comprises a ceramic, a glass-ceramic or a glass.

4. A pre-reformer as claimed in claim 1 wherein a temperature sensor is arranged to measure the temperature in the duct and is electrically connected to the control means.

5. A pre-reformer as claimed in claim 1 wherein the at least one electrically conducting member extends through the walls of the duct and is directly electrically connected to the electrical power supply.

6. A pre-reformer as claimed in claim 5 wherein the electrically conducting member is electrically isolated from the duct by glass seals or glass-ceramic seals.

7. A pre-reformer as claimed in claim 1 wherein the at least one electrically conducting member forms a loop, a second electrically conducting member is arranged outside the duct, the second electrically conducting member is electrically connected to the electrical power supply and the control means controls the supply of electrical current through the second electrically conducting member to maintain the at least one electrically conducting member at a temperature to provide selective thermal decomposition of higher hydrocarbons in the hydrocarbon fuel.

8. A pre-reformer as claimed in claim 1 wherein the at least one electrically conducting member comprises a honeycomb.

9. A pre-reformer as claimed in claim 1 wherein the at least one electrically conducting member comprises at least a portion of the duct.

10. A pre-reformer as claimed in claim 1 wherein the at least one electrically conducting member comprises a metal or an alloy.

11. A pre-former according to claim 1, wherein the hydrocarbon fuel is natural gas.

* * * * *